(12) United States Patent
Chang

(10) Patent No.: US 8,184,443 B2
(45) Date of Patent: May 22, 2012

(54) SIM CARD RETENTION ASSEMBLY

(75) Inventor: Cheng-Lung Chang, Taipei County (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 339 days.

(21) Appl. No.: 12/512,357

(22) Filed: Jul. 30, 2009

(65) Prior Publication Data
US 2010/0259906 A1  Oct. 14, 2010

(30) Foreign Application Priority Data
Apr. 13, 2009  (CN) .......................... 2009 1 0301522

(51) Int. Cl.
*H05K 5/00* (2006.01)
(52) U.S. Cl. ........ 361/759; 361/704; 361/747; 361/779; 439/64; 439/108; 439/159; 439/188; 439/680; 235/486
(58) Field of Classification Search .................. 361/759, 361/779.56, 704, 747; 439/64, 108, 159, 439/188, 680; 235/596
See application file for complete search history.

(56) References Cited

U.S. PATENT DOCUMENTS

| 5,725,385 A * | 3/1998 | Takano et al. .................... 439/64 |
| 6,045,049 A * | 4/2000 | Nishimura et al. ........... 235/486 |
| 6,213,785 B1 * | 4/2001 | Nishio et al. .................... 439/64 |
| 6,425,775 B1 * | 7/2002 | Chang et al. .................. 439/188 |
| 7,416,428 B1 * | 8/2008 | Hung et al. .................... 439/188 |
| 7,422,493 B2 * | 9/2008 | Wang et al. .................... 439/862 |
| 7,618,273 B1 * | 11/2009 | Wang et al. .................... 439/159 |
| 7,794,249 B2 * | 9/2010 | Yu et al. ........................ 439/159 |
| 2002/0114130 A1 * | 8/2002 | Schremmer et al. .......... 361/683 |
| 2006/0025019 A1 * | 2/2006 | Zhu et al. ....................... 439/630 |
| 2008/0045088 A1 * | 2/2008 | Wang et al. .................... 439/638 |
| 2010/0284157 A1 * | 11/2010 | Chang ........................... 361/747 |
| 2011/0128705 A1 * | 6/2011 | Chang ........................... 361/704 |

FOREIGN PATENT DOCUMENTS
CN  201194264 Y  2/2009
* cited by examiner

Primary Examiner — Xiaoliang Chen
(74) Attorney, Agent, or Firm — Altis Law Group, Inc.

(57) ABSTRACT

A retention assembly for a SIM card incorporated in a portable electronic device having a main body, includes a receiving portion, a limiting sheet and a resilient pressing member. The receiving portion is defined in the main body to receive the SIM card. The receiving portion defines an entrance end. The limiting sheet extends from a side of the receiving portion to an opposite side of the receiving portion to resist the SIM card. The resilient pressing member includes a fixing portion fixed to the main body, a limiting portion resisting an end of the SIM card adjacent to the entrance end of the receiving portion, and a resilient portion interconnecting with the fixing portion and the limiting portion to press against the SIM card.

7 Claims, 9 Drawing Sheets

SIM CARD RETENTION ASSEMBLY

BACKGROUND

1. Technical Field

The present disclosure relates to subscriber identification module (hereinafter referred to as SIM) card retention assemblies used in portable electronic devices.

2. Description of the Related Art

Mobile phones are widely used and have become a part of modern life. Many mobile phones have a SIM card for storing information. The SIM card may also contain personal information for the subscriber, for example, a listing of frequently used telephone numbers. Good electrical contact between the SIM card and the mobile phone is important. Therefore, a SIM card retention assembly is necessary for securing the SIM card in electronic devices such as mobile phones.

A typical assembly for holding a SIM card to a main body of the electronic device, includes a latching structure, and a receiving groove defined in the main body. A connector including a plurality of contacts is set in the middle of the receiving groove. The shape and size of the receiving groove correspond to a SIM card. The latching structure is movably fixed to the main body adjacent to the receiving groove. The latching structure can be moved above the receiving groove. In use, firstly, the latching structure is moved away from the receiving groove, and the SIM card is received in the receiving groove. Then, the latching structure is moved adjacent to the receiving groove and located above the receiving groove for latching the SIM card in the receiving groove. In the same way, the SIM card can be released by moving the latching structure away from the receiving groove.

In the above assembly for holding a SIM card, the latching structure can easily be moved. However, if a mobile phone employing such an assembly for holding a SIM card drops to ground, a shock can easily force the latching structure to move off the receiving groove. As a result, the SIM card will not connect well with the connector or could even be released from the receiving groove. Obviously, such a conventional assembly is not a trustworthy way of holding the SIM card steadily in the receiving groove.

Therefore, there is room for improvement within the art.

BRIEF DESCRIPTION OF THE DRAWINGS

Many aspects of the exemplary embodiments can be better understood with reference to the following drawings. The components in the drawings are not necessarily drawn to scale, the emphasis instead being placed upon clearly illustrating the principles of the exemplary embodiments. Moreover, in the drawings, like reference numerals designate corresponding parts throughout the several views.

DETAILED DESCRIPTION

The present SIM card retention assembly (hereinafter referred to as retention assembly) is suitable for portable electronic devices, such as mobile phones, PDAs, and so on.

Figure 1:
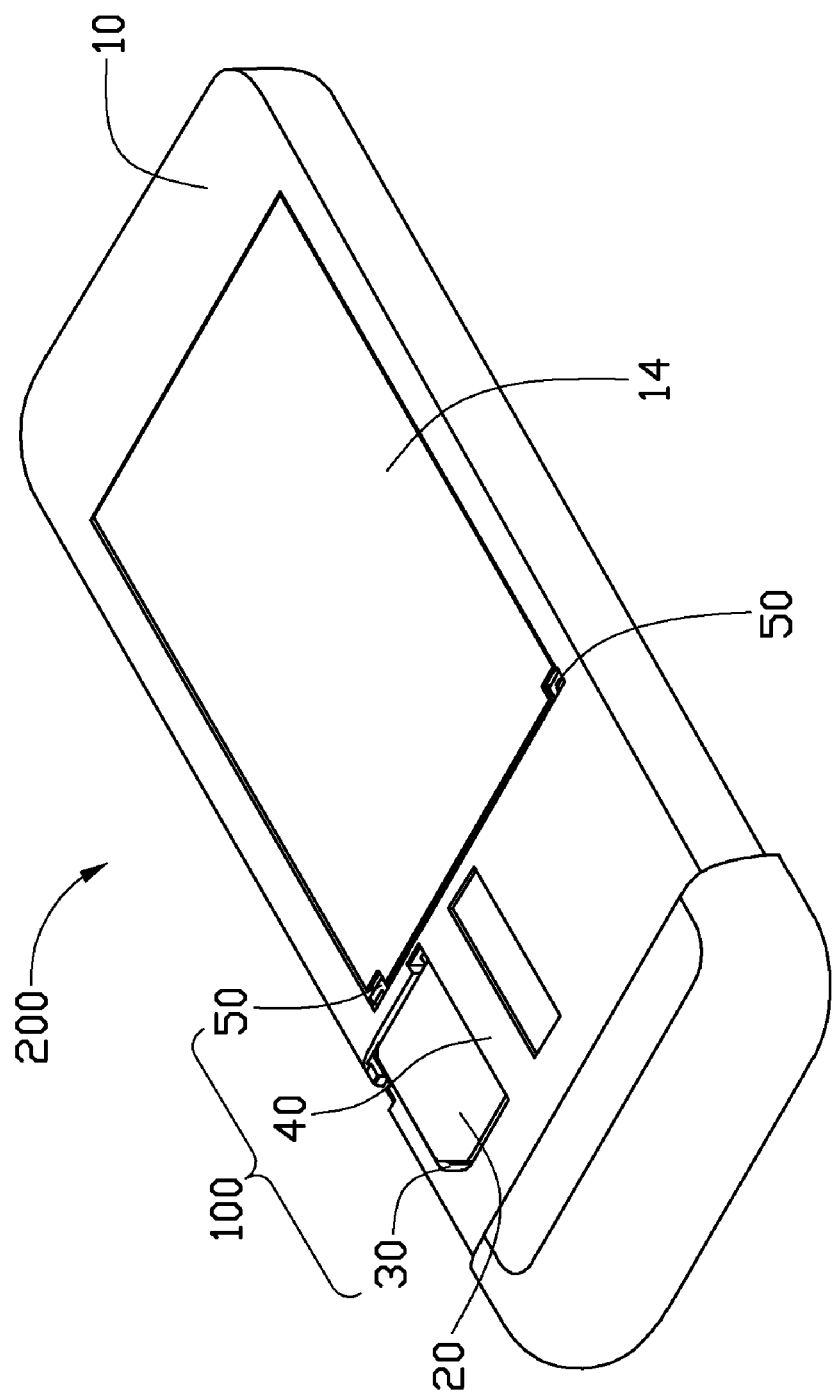
FIG. 1 is an assembled, isometric view of an exemplary embodiment of a portable electronic device with a SIM card retention assembly.
Figure 2:
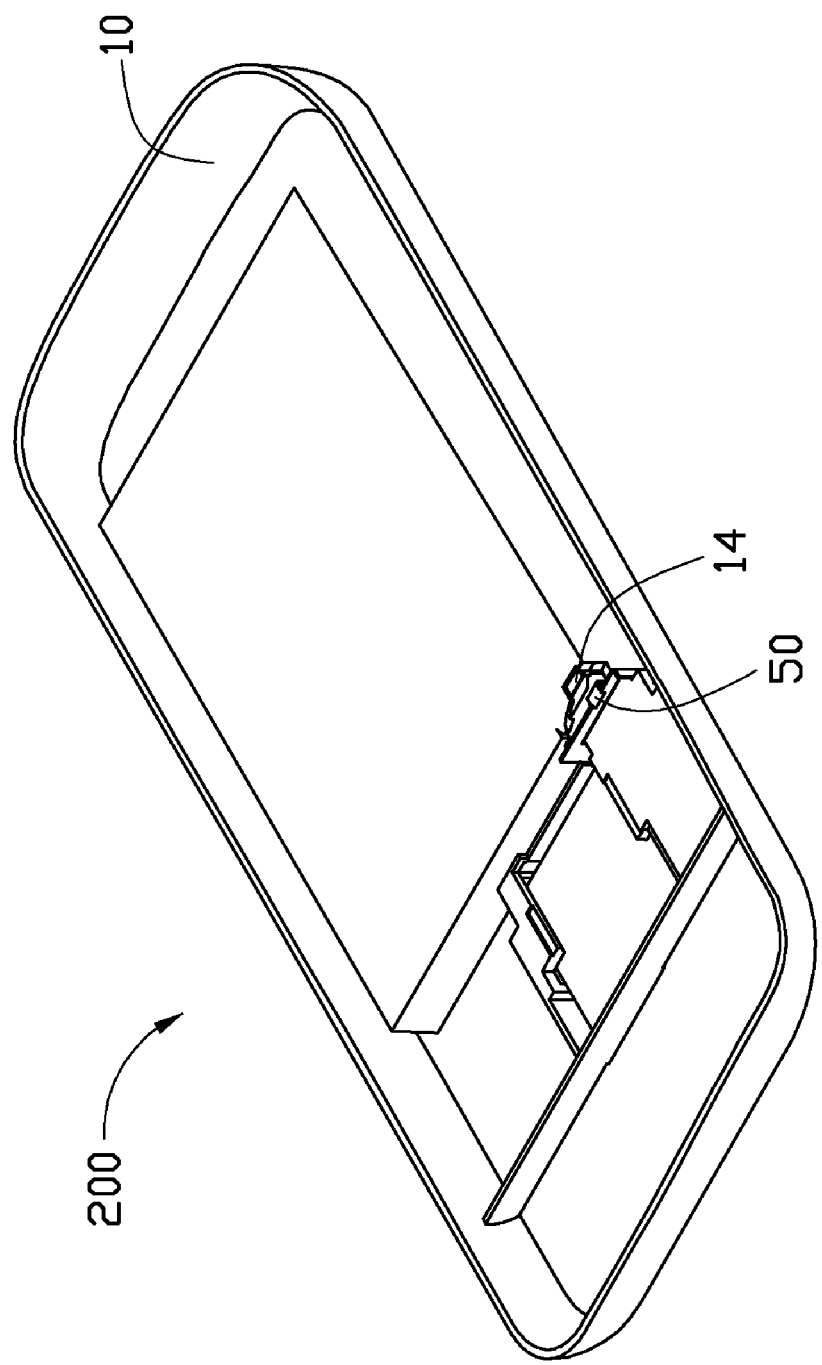
FIG. 2 is similar to FIG. 1, but viewed from another aspect.
Figure 3:
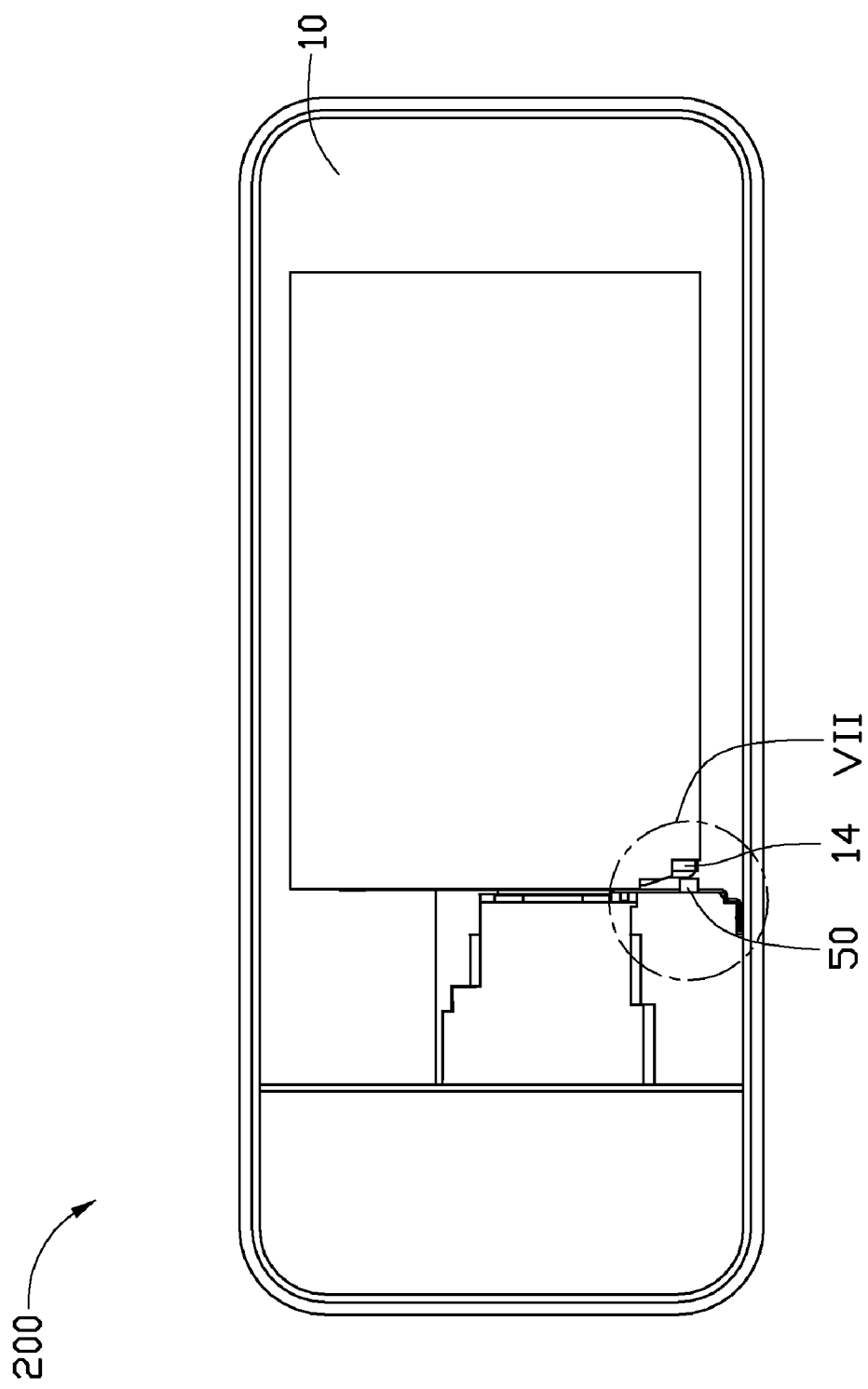
FIG. 3 is a top plane view of the portable electronic device of FIG. 2.
Figure 5:
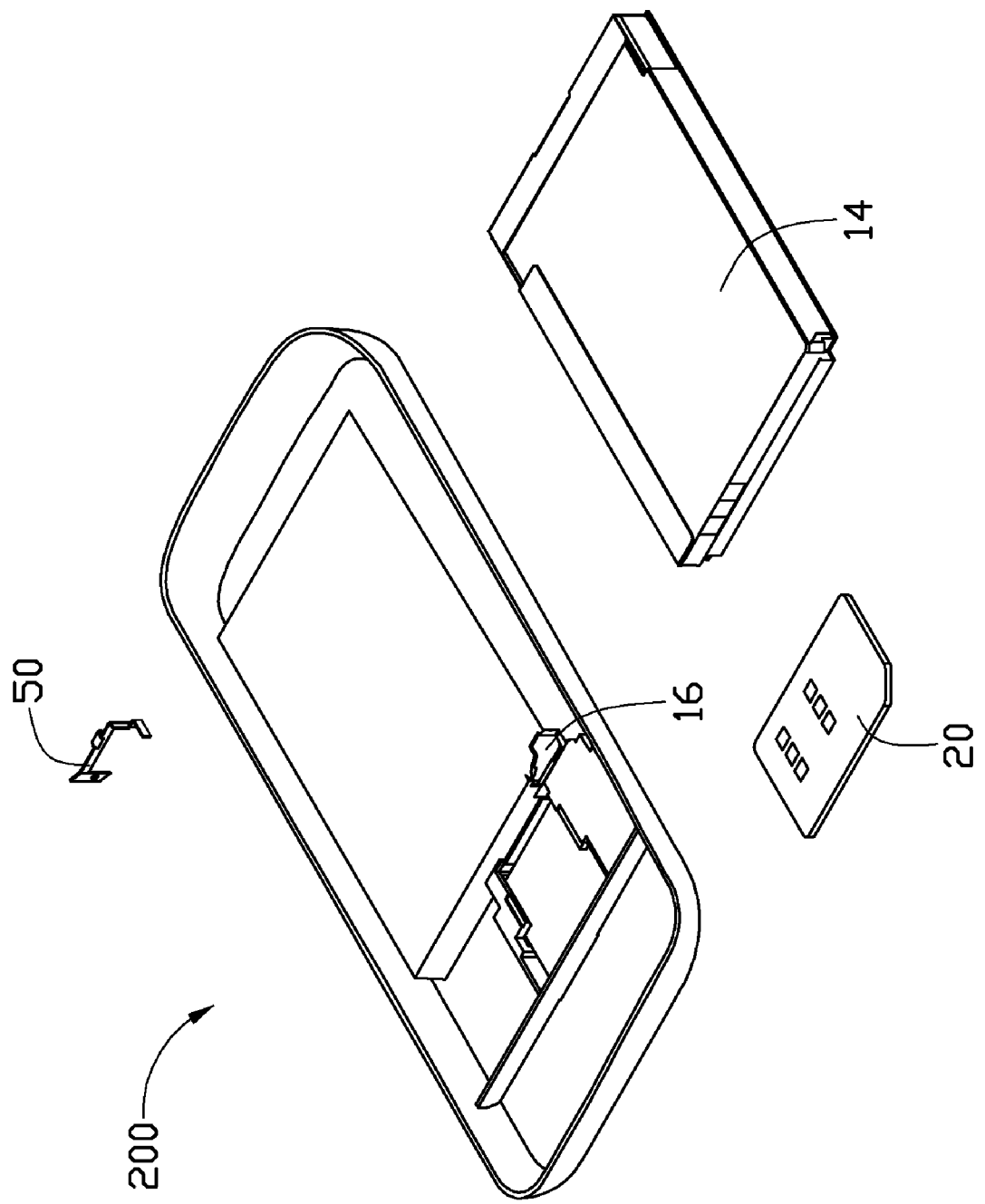
FIG. 5 is similar to FIG. 4, but viewed from another aspect.
Figure 7:
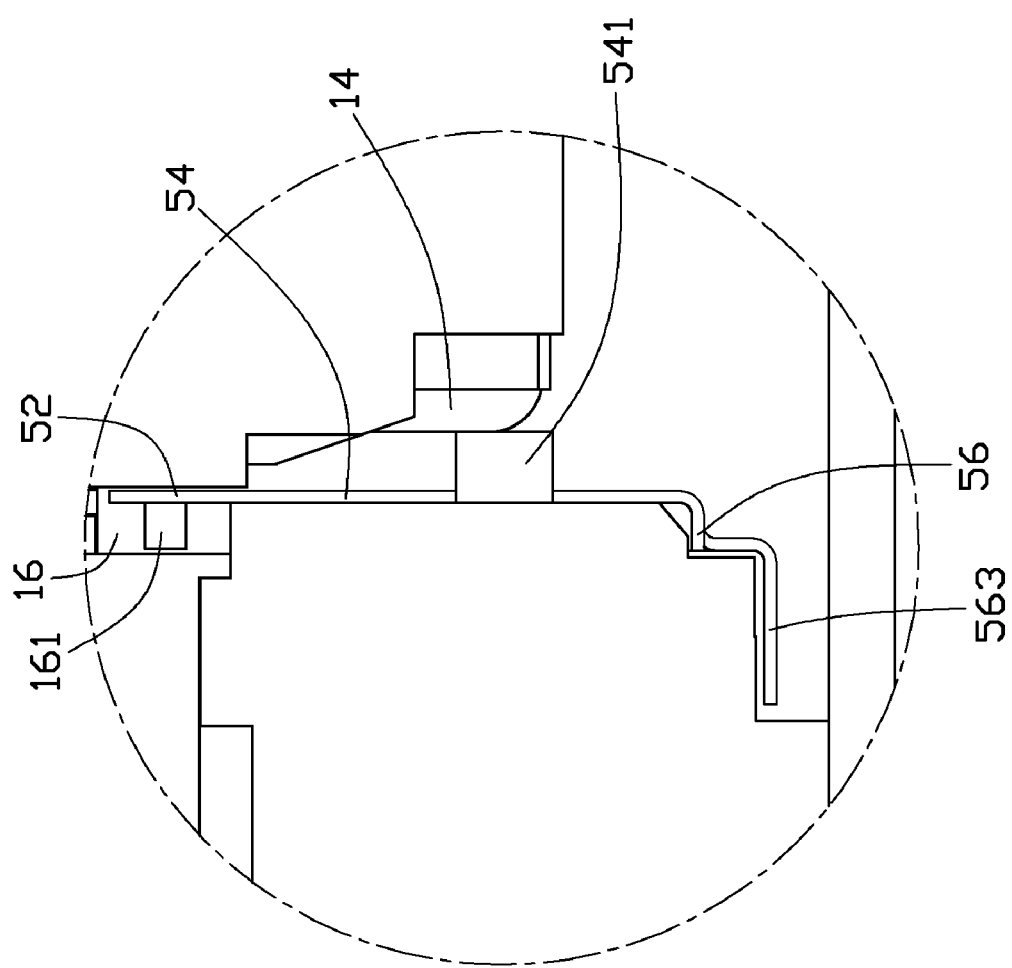
FIG. 7 is an enlarged view of a circle portion VII of FIG. 3.
Figure 8:
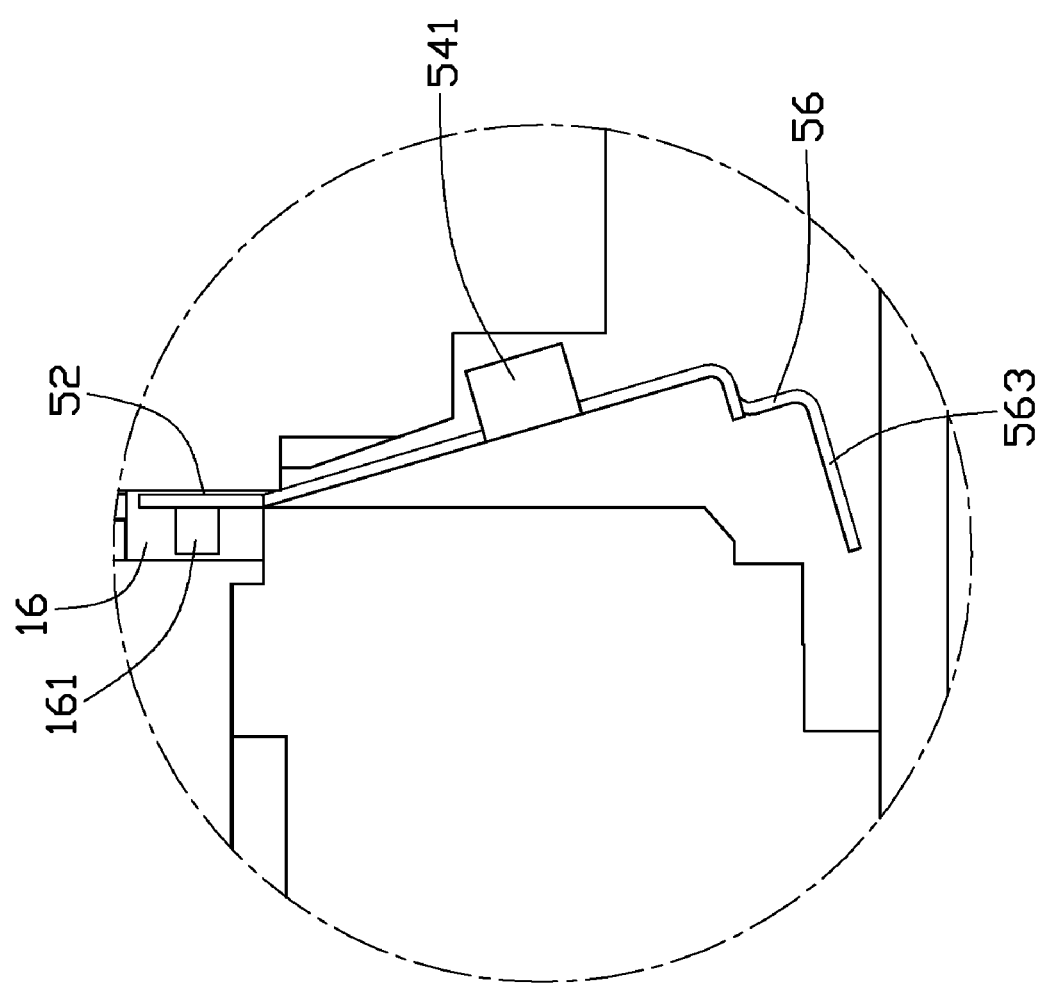
FIG. 8 is similar to FIG. 7, but showing another state of the resilient pressing member.

FIGS. 1 through 3 show a retention assembly 100 for a SIM card 20 incorporated in a portable electronic device 200. The mobile phone 200 and the SIM card 20 are taken here as an exemplary application, for the purposes of describing details of the retention assembly 100 of the exemplary embodiment. The mobile phone 200 includes a main body 10 and a battery 14. The main body 10 defines a receiving cavity 12 to receive the battery 14. The retention assembly 100 includes a receiving portion 30, a limiting sheet 40, and a resilient pressing member 50. The receiving portion 30 is formed in the main body 10 adjacent to the receiving cavity 12. Referring to FIGS. 5 and 7-8 together, the main body 10 further defines a mounting groove 16 between the receiving cavity 12 and the receiving portion 30 to fix the resilient pressing member 50. The main body 10 further includes a mounting protrusion 161 extending out from an inner sidewall of the mounting groove 16. In the illustrated exemplary embodiment, the mounting groove 16 communicates with the receiving cavity 12 and the receiving portion 30 at a side of the receiving portion 30.

Figure 4:
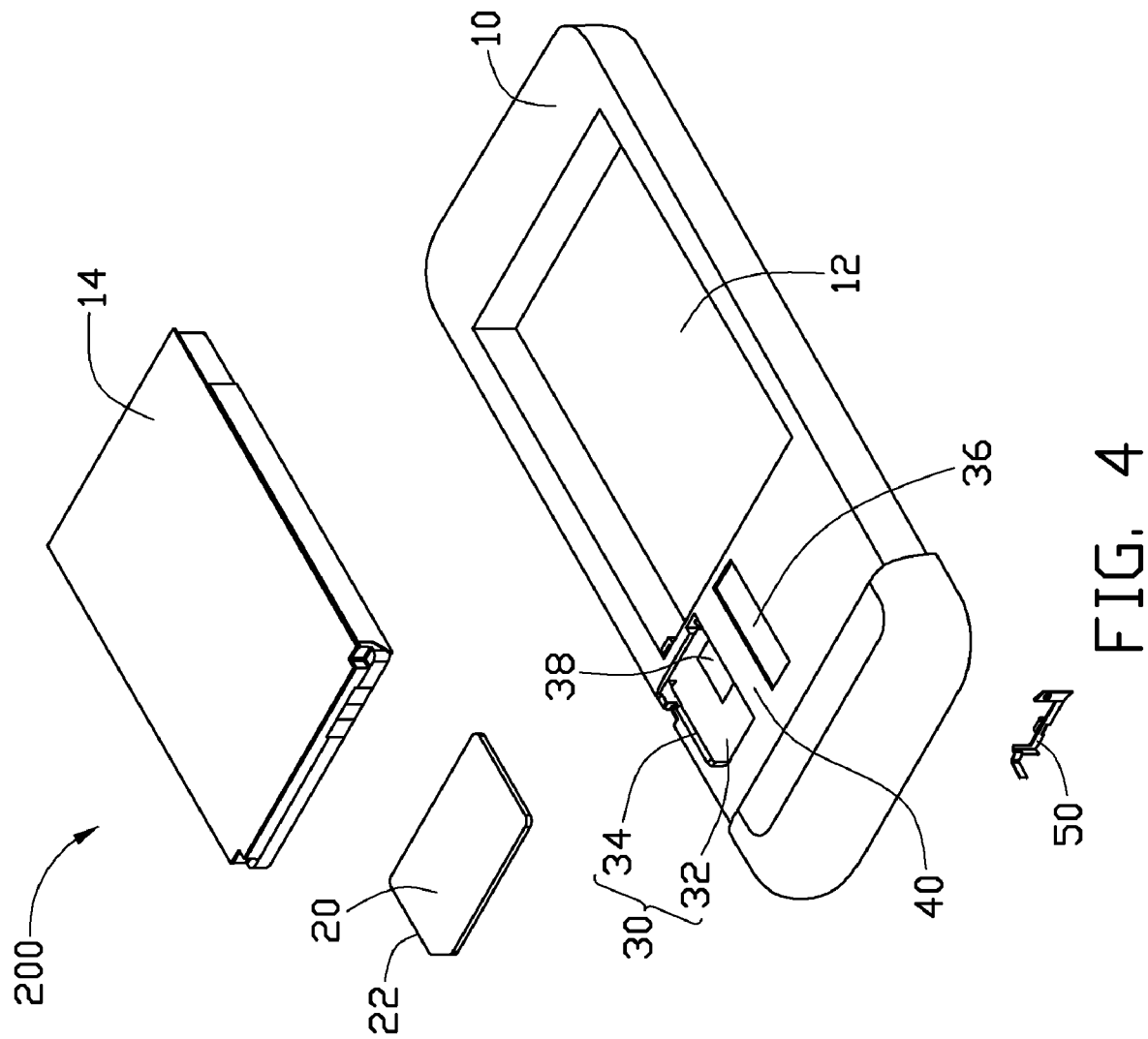
FIG. 4 is an exploded, isometric view of the portable electronic device of FIG. 1.

Referring to FIG. 4, the receiving portion 30 defines a receiving space to receive the SIM card 20, and the shape and size of the receiving portion 30 correspond to the SIM card 20. The receiving portion 30 includes a base 32, an entrance end 34, and a fixing end 36 opposite to the entrance end 34. A SIM card connector 38 including a plurality of contacts is set in the middle of the base 32, and the SIM card connector 38 is configured to electrically connect with the SIM card 20. The entrance end 34 is formed adjacent to and parallel to a side of the main body 10. The SIM card 20 can enter or exit via the entrance end 34. The limiting sheet 40 extends from a side of the receiving portion 30 to an opposite side of the receiving portion 30 to partially cover the receiving portion 30. The limiting sheet 40 is operated to resist the SIM card 20 received in the receiving portion 30.

Figure 6:
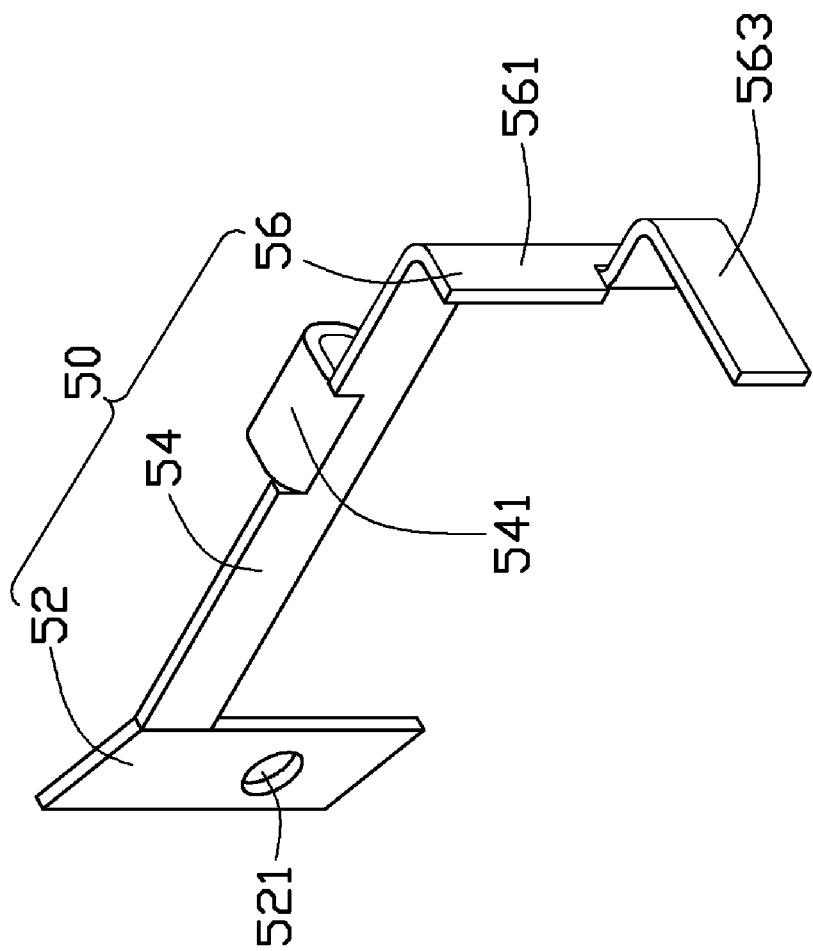
FIG. 6 is an enlarged, isometric view of a resilient pressing member of the SIM card retention assembly of FIG. 1.

Referring to FIG. 6 together, the resilient pressing member 50 includes a fixing portion 52, a resilient portion 54, and a limiting portion 56. The fixing portion 52 is fixed to the main body 10. The limiting portion 56 is latched with an end of the SIM card 20 adjacent to the entrance end 32 of the receiving portion 30. The resilient portion 54 interconnects with the fixing portion 52 and the limiting portion 56 to press against the SIM card 20.

In the illustrated exemplary embodiment, the resilient portion 54 is an elongated elastic sheet. The fixing portion 52 and the limiting portion 56 respectively extend from two opposite ends of the resilient portion 54, and respectively bend towards two sides of the resilient portion 54. The fixing portion 52 of the resilient pressing member 50 defines a mounting hole 521. The mounting protrusion 161 is fixedly mounted in and the mounting hole 521 to fix the resilient pressing member 50 tightly. The fixing portion 52, the resilient portion 54, and the limiting portion 56 cooperatively define a substantially L-shaped structure. The resilient pressing member 50 further includes a resisting portion 541 formed on the resilient portion 54. In this exemplary embodiment, the resisting portion 541 extends from a middle part of an edge of the resilient portion 54 and bends towards an opposite edge of the resilient portion 54 to form a hollow columnar structure. The limiting portion 56 includes a connecting body 561 and a hook 563. The connecting body 561 extends from an end of the resilient portion 54 away from the fixing portion 52 and bends outward. The hook 563 extends from a part of the connecting body 561 and bends outward to form an L-shaped structure.

Referring to FIGS. 4 and 7 again, in use, to mount the SIM card 20 in the receiving portion 30, firstly, the SIM card 20 is placed in the receiving portion 30 via the entrance end 32 to electrically connect with the contacts of the SIM card connector 38. Secondly, the battery 14 is placed in the receiving cavity 12, and a sidewall of the battery 14 presses against the resisting portion 541 of the resilient pressing member 50. At this time, the resilient portion 54 of the resilient pressing member 50 exerts a force toward the SIM card 20 via an elastic deformation, and the hook 563 is inserted into a space between an end of the SIM card 20 and a sidewall of the receiving portion 30 at the entrance end 32 so as to resist the end of the SIM card 20. The hook 563 can prevent the SIM card 20 from moving out of the receiving portion 30 via the entrance end 32. In addition, the resilient portion 54 presses the SIM card 20 along a direction parallel to the entrance end 32. Thus, the SIM card 20 is held steadily in the receiving portion 30.

Referring to FIG. 8 again, to remove the SIM card 20 from the receiving portion 30, firstly, the battery 14 is removed from the receiving cavity 12. Then, the resisting portion 541 of the resilient portion 54 is released, and the force applied to the SIM card 20 is withdrawn due to rebound of the resisting portion 54. At this time, the hook 563 of the limiting portion 56 is away from the end of the SIM card 20 at the entrance end 32. Secondly, the SIM card 20 is pulled out of the receiving portion 30 via the entrance end 32.

Figure 9:
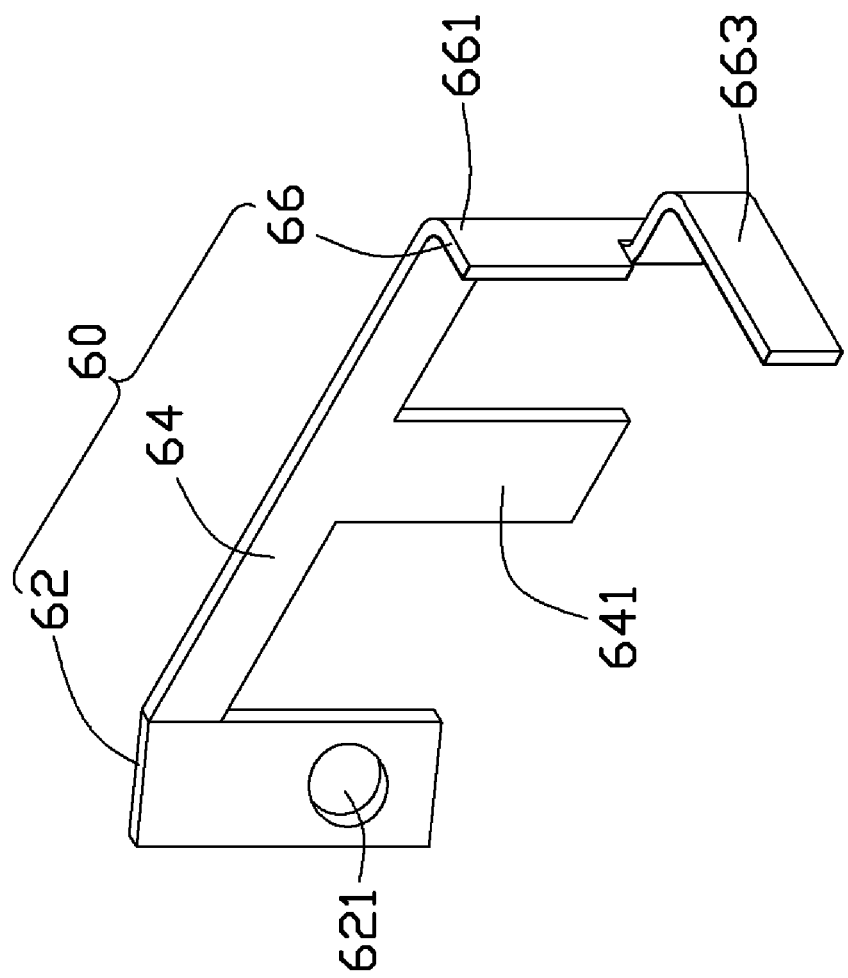
FIG. 9 is an isometric view of another exemplary embodiment of a resilient pressing member of the SIM card retention assembly.

Referring to FIG. 9, another exemplary embodiment of a resilient pressing member 60 is shown. The resilient pressing member 60 includes a fixing portion 62, a resilient portion 64, and a limiting portion 66. The fixing portion 62 defines a mounting hole 621. The limiting portion 66 includes a connecting body 661 and a hook 663. The resilient pressing member 60 is similar to the resilient pressing member 50 in principle, except that the fixing portion 62 and the limiting portion 66 respectively extend from two opposite ends of the resilient portion 64, and respectively bend towards a same side of the resilient portion 64 with different angles relative to the resilient portion 64. The resilient pressing member 60 further includes a control portion 641 extending from a part of the resilient portion 64. In this exemplary embodiment, the control portion 641 extends downward from a bottom edge of the resilient portion 64. The fixing portion 62 can be fixed to the main body 10, and the resilient portion 64 presses against the SIM card 20. The limiting portion 66 can resist an end of the SIM card 20 adjacent to the entrance end 32 of the receiving portion 30.

In use, to mount the SIM card 20 in the receiving portion 30, firstly, an external force is applied to draw the control portion 641 away from the receiving portion 30 to deform the resilient portion 64. At this time, SIM card 20 is pushed into the receiving portion 30 via the entrance end 32 to electrically connect with the contacts of the SIM card connector 38. Secondly, the user can remove the force applied to the control portion 641. At this time, the resilient portion 64 of the resilient pressing member 50 exerts a force toward the SIM card 20 due to the rebound of the resilient portion 64, and the hook 663 is inserted into a space between an end of the SIM card 20 and a sidewall of the receiving portion 30 at the entrance end 32 so as to resist the end of the SIM card 20. To remove the SIM card 20 from the receiving portion 30, the user can apply a force to draw the control portion 641 away from the receiving position 30. Then, the resilient portion 64 and the limiting portion 66 are also away from the SIM card 20. At this time, the SIM card 20 can be pulled out of the receiving portion 30 via the entrance end 32.

It is to be understood that, the mounting holes 521, 621 of the fixing portions 52, 62 of the resilient pressing members 50, 60 and the mounting protrusion 161 can be omitted. The fixing portions 52, 62 can be fixed to the sidewall of the mounting groove 16 by welding, and so on.

Finally, while the present disclosure has been described with reference to particular exemplary embodiments, the description is illustrative of the disclosure and is not to be construed as limiting the disclosure. Therefore, various modifications can be made to the exemplary embodiments by those of ordinary skill in the art without departing from the true spirit and scope of the disclosure as defined by the appended claims.

What is claimed is:

1. A portable electronic device comprising:
a main body;
and a card retention assembly comprising:
a receiving portion defined in the main body configured to receive a SIM card, the receiving portion comprising an entrance end,
a limiting sheet extending from a side of the receiving portion to an opposite side of the receiving portion to resist the SIM card, and
a resilient pressing member comprising:
a fixing portion fixed to the main body,
a limiting portion resisting an end of the SIM card adjacent to the entrance end,
a resilient portion interconnecting with the fixing portion and the limiting portion, and pressing against the SIM card in the receiving portion;
wherein the fixing portion and the limiting portion respectively extend from two opposite ends of the resilient portion, and respectively bend towards two sides of the resilient portion;
a resisting portion extending from a middle part of an edge of the resilient portion and bending towards an opposite edge of the resilient portion to form a hollow columnar structure.

2. The portable electronic device of claim 1, wherein the main body further defines a mounting groove adjacent to the receiving portion to fix the resilient pressing member.

3. The portable electronic device of claim 2, wherein the main body further comprises a mounting protrusion extending out from an inner sidewall of the mounting groove; the fixing portion of the resilient pressing member defines a mounting hole therein, and the mounting protrusion is fixedly mounted in the mounting hole to fix the resilient pressing member.

4. The portable electronic device of claim 1, wherein the limiting portion comprises a connecting body and a hook, the connecting body extending from an end of the resilient portion away from the fixing portion and bending outward, and the hook extending from a part of the connecting body and bending outward to form an L-shaped structure to resist the end of the SIM card adjacent to the entrance end.

5. The portable electronic device of claim 1, wherein the fixing portion and the limiting portion respectively extend from two opposite ends of the resilient portion, and respectively bend towards a same side of the resilient portion with different angles relative to the resilient portion.

6. The portable electronic device of claim 1, wherein the resilient pressing member further comprising a control portion extending downward from a bottom edge of the resilient portion.

7. The portable electronic device of claim 1, further comprising a battery, the main body defines a receiving cavity communicating with the receiving portion, the battery is received in the receiving cavity and presses against the resisting portion.

* * * * *